United States Patent
Wang et al.

(10) Patent No.: US 9,225,436 B2
(45) Date of Patent: Dec. 29, 2015

(54) METHOD, DEVICE AND TERMINAL EQUIPMENT FOR REDUCING INTERFERENCE AMONG COMMUNICATION MODULES IN TERMINAL EQUIPMENT

(71) Applicant: FUJITSU LIMITED, Kawasaki-shi, Kanagawa (JP)

(72) Inventors: Weiwei Wang, Beijing (CN); Hua Zhou, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 195 days.

(21) Appl. No.: 13/962,715

(22) Filed: Aug. 8, 2013

(65) Prior Publication Data
US 2013/0322317 A1 Dec. 5, 2013

Related U.S. Application Data (63) Continuation of application No. PCT/CN2011/070930, filed on Feb. 11, 2011.

(51) Int. Cl.
*H04B 15/00* (2006.01)
*H04L 1/00* (2006.01)
(Continued)

(52) U.S. Cl.
CPC *H04B 15/00* (2013.01); *H04L 1/00* (2013.01); *H04W 28/048* (2013.01); *H04W 88/02* (2013.01)

(58) Field of Classification Search
CPC . H04W 88/06; H04W 72/1215; H04W 16/14; H04W 84/18; H04W 84/12; H04W 72/082
See application file for complete search history.

(56) References Cited

U.S. PATENT DOCUMENTS

2003/0147368 A1* 8/2003 Eitan et al. ............... 370/338
2006/0292987 A1 12/2006 Ophir et al.
(Continued)

FOREIGN PATENT DOCUMENTS

CN 101310479 11/2008
CN 101646245 2/2010

OTHER PUBLICATIONS

International search report issued for corresponding International Patent Application No. PCT/CN2011/070930, mailed Nov. 24, 2011.
(Continued)

*Primary Examiner* — Jung Park
(74) *Attorney, Agent, or Firm* — Myers Wolin, LLC (57) ABSTRACT

A method, device and terminal equipment for reducing interference among communication modules in the terminal equipment are provided in the present invention. Wherein, said communication modules comprise communication system modules in the terminal equipment and coexistence system modules coexisting with said communication system modules. Said method for reducing interference among communication modules in the terminal equipment comprises: the information related to work time of said coexistence system modules is transmitted to a base station which the communication system modules belong to as assistant information; said base station configures time division multiplexing configuration information according to said assistant information; and the time division multiplexing is performed among each of the communication modules according to said time division multiplexing configuration information. By the present invention, the interference among each of the communication modules in the terminal equipment can be reduced.

15 Claims, 2 Drawing Sheets

(51) Int. Cl.
*H04W 28/04* (2009.01)
*H04W 88/02* (2009.01)

(56) References Cited

U.S. PATENT DOCUMENTS

| | | | |
|---|---|---|---|
| 2007/0224936 A1* | 9/2007 | Desai | 455/41.2 |
| 2007/0281617 A1* | 12/2007 | Meylan et al. | 455/41.2 |
| 2012/0069766 A1* | 3/2012 | Fu et al. | 370/252 |
| 2012/0207040 A1* | 8/2012 | Comsa et al. | 370/252 |
| 2013/0010766 A1* | 1/2013 | Sadek et al. | 370/336 |
| 2013/0242919 A1* | 9/2013 | Koo et al. | 370/329 |
| 2014/0293973 A1* | 10/2014 | Lin et al. | 370/336 |

OTHER PUBLICATIONS

PCT First Notice issued by the International Bureau for corresponding International Patent Application No. PCT/CN2011/070930, mailed Sep. 13, 2012.

PCT Second Supplementary Notice issued by the International Bureau for corresponding International Patent Application No. PCT/CN2011/070930, mailed Jun. 13, 2013.

PCT Notice Concerning the Availability of the Publication of the International Application issued by the International Bureau for corresponding International Patent Application No. PCT/CN2011/070930, mailed Aug. 16, 2012.

PCT Notification of Receipt of Record issued by the International Bureau for corresponding International Patent Application No. PCT/CN2011/070930, mailed Mar. 17, 2011.

Intel Corporation (UK) Ltd., "TDM Solutions for In-Device Coexistence", Agenda Item: 7.8, R2-105666, 3GPP TSG-RAN WG2 #71bis, Xi'an, China, Oct. 11-15, 2010.

Notification of the First Office Action issued for corresponding Chinese Patent Application No. 201180050527.X issued on Apr. 24, 2015 with an English translation.

* cited by examiner

METHOD, DEVICE AND TERMINAL EQUIPMENT FOR REDUCING INTERFERENCE AMONG COMMUNICATION MODULES IN TERMINAL EQUIPMENT

CROSS-REFERENCE TO RELATED APPLICATIONS

This application is a continuation of International Application No. PCT/CN2011/070930, filed Feb. 11, 2011, the entire contents of which are incorporated herein by reference.

FIELD OF THE INVENTION

The present invention generally relates to the field of wireless communication, more particularly to a method of decreasing interference between communication modules in a terminal apparatus and a device and a terminal apparatus thereof.

BACKGROUND OF THE INVENTION

With the advancements in wireless communication technologies, various communication modules may be integrated into the terminal apparatus, such as the LTE (Long Term Evolution) and LTE-A (LTE Advanced) modules, 3G (Third Generation) modules, WLAN (Wireless Local Area Network) modules, Bluetooth modules and GNSS (Global Navigation Satellite System) modules. This enables the terminal apparatus to access multiple wireless networks at the same time.

However, as the physical interval between the tranceivers of the communication modules in the terminal apparatus are small, and the operating frequencies of the communication modules are close, when the terminal apparatus gets access to multiple wireless networks, the communication modules may interfere with each other. Therefore, it is an urgent problem to be solved by those skilled in the art.

SUMMARY OF THE INVENTION

In view o of the above, the embodiments of the present invention provide a method of decreasing interference between communication modules in a terminal apparatus and a device and a terminal apparatus thereof.

According to an aspect of the embodiments of the present invention, a method of decreasing interference between communication modules in a terminal apparatus is provided, the communication modules including a communication system module in the terminal apparatus and a coexisting system module coexisting with the communication system module, the method of decreasing interference between communication modules in a terminal apparatus including:

sending information related to operating time of the coexisting system module to a base station to which the communication system module belongs as auxiliary information;

configuring time division multiplexing configuration information by the base station according to the auxiliary information; and conducting time division multiplexing between the communication modules according to the time division multiplexing configuration information. By using the present invention, interference between communication modules in a terminal apparatus can be decreased.

According to another aspect of the embodiments of the present invention, a device of decreasing interference between communication modules in a terminal apparatus is provided, the communication modules including a communication system module in the terminal apparatus and a coexisting system module coexisting with the communication system module, the device of decreasing interference between communication modules in a terminal apparatus including:

a sending unit, configured to send information related to operating time of the coexisting system module to a base station to which the communication system module belongs as auxiliary information;

a receiving unit, configured to receive time division multiplexing configuration information configured by the base station according to the auxiliary information; and a time division multiplexing unit, configured to conduct time division multiplexing between the communication modules according to the time division multiplexing configuration information.

According to another aspect of the embodiments of the present invention, a terminal apparatus is provided, the terminal apparatus including the above device of decreasing interference between communication modules in a terminal apparatus.

According to another aspect of the embodiments of the present invention, a storage medium is provided. The storage medium includes machine-readable program code that causes an information processing device to perform the above method of decreasing interference between communication modules in a terminal apparatus according to the present invention when executed by the information processing device.

According to another aspect of the embodiments of the present invention, a program product is provided. The program product includes machine-readable instructions that cause an information processing device to perform the above method of decreasing interference between communication modules in a terminal apparatus according to the present invention when executed by the information processing device.

According to the method of the embodiments of the present invention, information related to operating time of the coexisting system module can be sent to a base station to which the communication system module belongs as auxiliary information; the base station then can configure time division multiplexing configuration information according to the auxiliary information and return it to the terminal apparatus; the terminal apparatus can conduct time division multiplexing between the communication modules according to the time division multiplexing configuration information returned by the base station. In this manner, interference between communication modules in a terminal apparatus can be decreased.

Other aspects of the embodiments of the present invention will be described hereinafter, where preferred embodiments of the present invention are sufficiently disclosed without limiting the scope of the present invention.

BRIEF DESCRIPTION OF THE DRAWINGS

The above and other objects and advantages of the embodiments of the present invention will be further described in conjunction with more detailed embodiments and with reference to the accompanying drawings. In the accompanying drawings, the same or corresponding reference numerals denote the same or corresponding technical features or components.

DETAILED DESCRIPTION OF THE EMBODIMENTS

The embodiments of the present invention are described below with reference to the accompanying drawings.

It is noted that in the embodiments of the present invention the communication modules in the terminal apparatus may include a communication system module and a coexisting system module coexisting with the communication system module. The communication system module is normally an LTE (Long Term Evolution) module, an LTE-A (LTE Advanced) module, a 3G (Third Generation) module, etc. Generally, these communication system modules have to cooperate with a base station to which the communication system module belongs for signal transmitting and receiving, in order to realize call originating and receiving, short message/multimedia message sending and receiving, Internet functions, etc.

The coexisting system module coexisting with the communication system module may be a WLAN module (normally for connecting to a network, specifically, wirelessly connecting to a LAN at a specified radio frequency band), a Bluetooth module (normally for short-distance data transmission with other mobile terminals), a GNSS module (normally for satellite-based locationing, which includes obtaining data such as maps from a satellite navigation system and displaying it), etc. In the embodiments of the present invention, the coexisting system module may include one or more communication modules as described above.

In practical applications, the coexisting system modules above are generally referred to as ISM (Industrial, Scientific and Medical) band modules; hence in the embodiments of the present invention, these coexisting system modules are also referred to as ISM modules for illustrative purposes. In addition, the communication system module in the terminal apparatus is assumed as an LTE module. As a matter of course, those skilled in the art understand that the embodiments of the present invention are also applicable to those communication systems that are not an LTE system.

Figure 1:
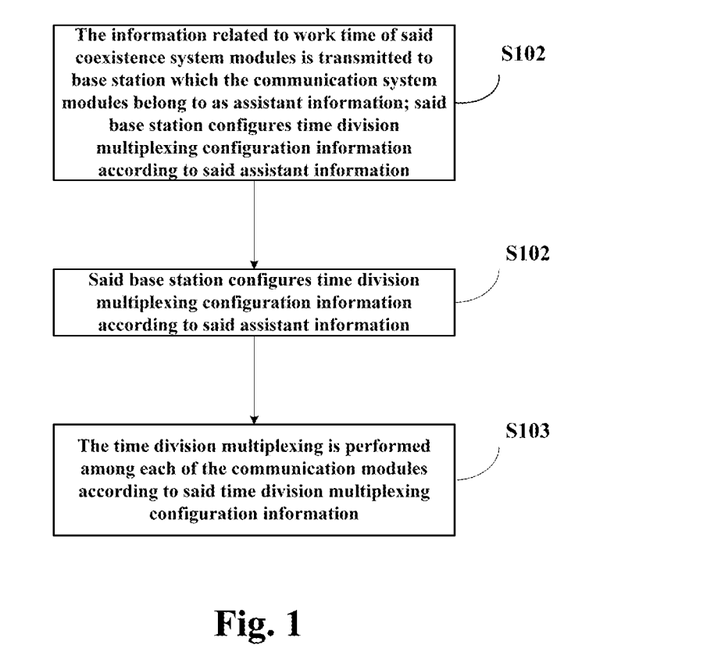
FIG. 1 is a flow chart illustrating a method provided by an embodiment of the present invention.

As shown in FIG. 1, a method of decreasing interference between communication modules in a terminal apparatus according to an embodiment of the present invention includes the following steps.

S101: sending information related to operating time of the coexisting system module to a base station to which the communication system module belongs as auxiliary information.

It is noted that since the auxiliary information is sent to a base station to which the communication system module belongs, the sending may specifically be performed by the LTE module in the terminal apparatus; as a result, information interaction is required in the terminal apparatus. For example, the ISM module may notify the LTE module of the information related to its operating time, or, statistics may be conducted on the operating status of the ISM module. For example, in the latter case, since generally the ISM module operates only when a service flow is to be transmitted and is not operating at any other time, by measuring the ISM module, information related to operating time of the ISM module can be collected, e.g., operating time length information of each operating. These parameters related to operating time can be sent to a base station of a mobile communication system as auxiliary information.

S102: configuring time division multiplexing configuration information by the base station according to the auxiliary information.

On receipt of the auxiliary information, the base station may assign time division multiplexing configuration information to the terminal apparatus. The time division multiplexing configuration information may include start point and stop point of the operating time of each of the communication modules (including the LTE module and the ISM module), operating time length, etc. In other words, the base station tries to ensure that the communication modules do not transmit or receive signals at the same time in order avoid interference between one another. Then, the base station may return the time division multiplexing configuration information to the terminal apparatus.

S103: conducting time division multiplexing between the communication modules according to the time division multiplexing configuration information.

On receipt of the time division multiplexing configuration information returned by the base station, the terminal apparatus may conduct time division multiplexing between the communication modules according to the time division multiplexing configuration information, so as to coordinate operations between the LTE module and the ISM module, so that the communication modules do not transmit or receive signals at the same time to the greatest extent possible, in order avoid interference between one another.

In practical applications, the specific information related to the operating time may be different when the operating mode of the ISM module is different. The operating modes of the ISM module may include an energy-saving mode and a non-energy-saving mode, and the energy-saving mode may further be divided into a periodic-energy-saving mode and a non-periodic-energy-saving mode. The periodic-energy-saving mode refers to a mode in which the waking moment of the ISM module is periodic, with the waking moment length being fixed or variable. For example, for a WLAN module, the periodic-energy-saving modes defined in IEEE802.11 include Normal Power Saving and Scheduled Automatic Power Save Delivery (S-APSD). The non-periodic-energy-saving mode refers to a mode in which the waking moment of the ISM module is non-periodic, with the waking moment length being fixed or variable. For example, for a WLAN module, Unscheduled Automatic Power Save Delivery (U-APSD) is a non-periodic-energy-saving mode. Detailed descriptions are given below. It is noted that in the description of the embodiments below, the number of ISM modules included in the terminal apparatus is not limited, i.e., the terminal apparatus may include one or more ISM modules.

Firstly, when the ISM module operates in a non-periodic-energy-saving mode, i.e., the ISM module can transmit or receive signals at any time, the information related to operating time of the ISM module may include: operating time length information of each operating of the ISM module.

As discussed above, the ISM module generally operates only when a service flow is to be transmitted; hence, statistic can be conducted on the operating status of the ISM module over a period of time, to obtain operating time length information of each operating of the ISM module. The collected information related to the operating time is effectively the operating time characteristic information of the ISM module from an history operating record of the ISM module. The operating time characteristic information provides a valuable reference to the configuration of a time division multiplexing mode.

Specifically, the operating time length information of each operating may include various information, for example, at least one of: minimum operating time length needed on condition that a preset spectral efficiency is ensured, average operating time length of an operating, minimum operating time length of an operating, and maximum operating time length of an operating, etc. When auxiliary information is to be sent to a base station to which the LTE module belongs, some or all of these parameters may be sent as the auxiliary information. If only some of the parameters are sent to the base station, the base station can assign an operating time length to the ISM module for time division multiplexing according to the received parameters; otherwise, in the case where all of the parameters are sent to the base station, the base station can assign more proper time division multiplexing configuration information to the ISM module by fully taking the parameters into account from multiple perspectives.

Average, minimum and maximum operating time length of an operating can be obtained from: measuring the ISM module over a period of time for its operating time length of each operating, and obtaining an average value of the operating time lengths to obtain the average operating time length of an operating, comparing the operating time lengths to determine the smallest one as the minimum operating time length of an operating and the largest one as the maximum operating time length of an operating.

The base station to which the LTE module belongs can assign an operating time length of each operating to the ISM module according to the above parameters. For example, if the average operating time length of an operating of an ISM module is sent to the base station as the auxiliary information, the base station may make the operating time length of the ISM module be as close to the parameter as possible. Alternatively, if the minimum operating time length of an operating of an ISM module is sent to the base station as the auxiliary information, the base station may make the operating time length of the ISM module be as larger than the parameter as possible. Alternatively, if the maximum operating time length of an operating of an ISM module is sent to the base station as the auxiliary information, the base station may make the operating time length of the ISM module be as smaller than the parameter as possible. Alternatively, if all these parameters are sent to the base station as the auxiliary information, the base station may make the operating time length of the ISM module be as close to the average as possible, as larger than the minimum as possible, and as smaller than the maximum as possible.

The minimum operating time length needed on condition that a preset spectral efficiency is ensured is described in detail below. This parameter refers to the amount of time required for the ISM module to achieve a preset spectral efficiency. Specifically, in order to obtain this parameter, the operating status of the ISM module may be measured to obtain the operating time length of each operating and corresponding speed achieved by the ISM module under each operating time length. Then, the spectral efficiency of the ISM module under each operating time length can be obtained in conjunction with some other parameters in the system. Moreover, generally an ISM module has a required minimum spectral efficiency; therefore the corresponding minimum operating time length on condition that the minimum spectral efficiency of the ISM module is ensured can be obtained.

When the minimum operating time length needed on condition that a preset spectral efficiency is ensured is sent to the base station as the auxiliary information, in assigning an operating time to the ISM module, the base station may try to ensure that the operating time length of each operating of the ISM module is larger than the parameter. The reason to do so is described below.

Assuming the ISM module is a WLAN module, from tests and simulations, when the duty ratio of the operating time length of the LET module to the WLAN module is ensured, the WLAN module will achieve a different throughput if it is assigned a different operating time length. For example, when the duty ratio is 1:1, i.e., in each period the LTE module and the WLAN module have the same operating time length, the WLAN module, if assigned an operating time length 10 ms, will achieve a lower speed than the case where it is assigned an operating time length 20 ms. As a matter of course, the parameter is determined by multiple factors, e.g., the number of WLAN terminals in the WLAN, channel conditions in the WLAN, error probabilities, etc. When the parameter is provided to the base station, and the base station assigns an operating time length to the WLAN module according to the parameter, the spectral efficiency of the WLAN module can be effectively improved by taking this parameter into account. For example, in order to improve the spectral efficiency of the WLAN module, in assigning an operating time to the WLAN module, the base station may ensure the required duty cycle as well as ensure that the operating time length of each operating of the WLAN module is larger than the parameter.

As a matter of course, in the embodiments of the present invention time division multiplexing is conducted between the communication modules, for one ISM module, it operates only during a preconfigured period of time, and other periods of time are assigned to other communication modules. Therefore, in this case, it is allowed that each ISM module operates in an energy-saving mode, which can reduce power consumption while decreasing interference between the communication modules. Therefore, the technical solution provided by the embodiments of the present invention may be combined with the energy-saving mode of the ISM module, and detailed description is given bellow.

It is noted that, as discussed above, for one ISM module, the energy-saving mode may be a periodic-energy-saving mode or a non-periodic-energy-saving mode. In the periodic-energy-saving mode, a sleep time is preconfigured, and the ISM module wakes up according to the preconfigured sleep time. That is, for an ISM module, if it supports the periodic-energy-saving mode, its sleep time information is preconfigured. In another aspect, for an ISM mode in a sleep mode, the ISM model has two states: sleep and awake, and the ISM model operates only in awake state, including data transmitting and receiving. Therefore, after getting access to a network, generally the ISM module will notify the AP (access point) of its sleep time information through interaction with the AP. And the AP transmits downlink data to the ISM module when it is awake. In other words, the ISM module and the AP coordinate a sleep time and the AP performs interactions with the ISM module according to the coordinated sleep time. As a result, once the sleep time is coordinated, the time for the ISM module to wake up does not change. As as matter of change, if it is needed to to change the sleep information such as when the ISM module wakes up, coordination is performed with the AP again and the modified sleep time information is re-notified to the AP.

In the embodiments of the present invention, the base station to which the LTE module belongs assigns an operating time to the ISM module, i.e., when to operate and for how long it operates. In a periodic-energy-saving mode, since the time for the ISM module to wake up does not change once the sleep time is coordinated, the sleep time information of the ISM module has to be sent to the base station as the auxiliary information. In this manner, while assigning the operating time for time division multiplexing to the ISM module, the base station to which to the LTE belongs can determine when the ISM starts to operate according to the information.

It is noted that the sleep time information of the ISM module is practically a type of information related to operating time, because the ISM module operates only after waking up.

As can be seen, if the ISM module operates in a periodic-energy-saving mode, the sleep time information of the ISM module can be sent to the base station to which the LTE module belongs as the auxiliary information. Specifically, the sleep time information may include the waking moment and waking period of the ISM module. In other words, the base station to which the LTE module belongs to may be notified of when the ISM module wakes up, and for how long the awake state will lasts after each waking up. The base station to which the LTE module belongs to may, while determining time division multiplexing between the communication modules according to these information, set the start point of the operating time of the ISM module to be the waking moment of the ISM module or earlier than the waking moment of the ISM module, and set the operating time length of each operating of the ISM module to be not longer than the lasting time of the awake state of the ISM module.

Because the ISM module wakes up periodically, the terminal apparatus can decide which waking moment of the ISM module it is to be sent to the base station to which the LTE module belongs to as the auxiliary information. For example, it may be the next waking moment of the ISM module from the current moment, a waking moment after a number of energy-saving periods, etc.

It is noted that if the ISM module is a WLAN module, for an normal energy-saving mode, when the AP has downlink data for the ISM module, the AP will send to the WLAN module a beacon frame when the WLAN module wakes up, and notifies the terminal apparatus that the downlink data is to be sent. For example, a TIM (Traffic Indication Map) to the terminal apparatus included in the received beacon frame will indicate that the the AP has downlink unicast data for the terminal apparatus; and a DTIM (Delivery Traffic Indication Message) to the terminal apparatus in the received beacon frame will indicate that the AP has downlink multicast/broadcast data for the terminal apparatus. In other words, the waking moment of the ISM module can be determined by the time the terminal apparatus receives the next beacon frame.

The waking period of the WLAN module can be determined by configured system parameters. For example, in a normal energy-saving mode, two parameters ListenInterval and DTIM period indicate the period for the WLAN module to receive a beacon frame containing TIM and DTIM. The two parameters are a multiple of the transmitting period of the beacon frame (normally 102.4 ms). Therefore, according to the type of the beacon frame (beacon frames containing TIM and/or DTIM) to be received by the terminal apparatus, ListenInterval and DTIM period can be sent to the base station to which the LTE module belongs to as the auxiliary information. For the Scheduled Automatic Power Save Delivery mode, the time when the WLAN module wakes up is determined by the service start time and the minimum service interval. Therefore the terminal apparatus can determine the waking period of the WLAN module according to the two parameters, and send them to the base station to which the LTE module belongs to as the auxiliary information for the WLAN module.

As a matter of course, in practical applications, in order to achieve more proper time division multiplexing configuration information configured by the base station, when the ISM module operates in a periodic-energy-saving mode, in addition to using the sleep time as the auxiliary information, the operating time length information of each operating of the ISM module may also be sent to the base station to which the LTE module belongs as the auxiliary information. In this manner, the the base station to which the LTE module belongs can configure more proper operating time length in time division multiplexing for the ISM module according to the operating time length of each operating of the ISM module.

Similarly to the above, the operating time length of each operating of the ISM module may include any one or more of: minimum operating time length needed on condition that a preset spectral efficiency is ensured, average operating time length of an operating, minimum operating time length of an operating, and maximum operating time length of an operating.

Similarly, when more auxiliary information is sent to the base station, the base station can coordinate between the communication modules more comprehensively.

Moreover, in a non-periodic-energy-saving mode, the terminal apparatus can control the sleep time of the ISM module. That is, when a service is to be transmitted, the ISM module can wake up automatically, and when the service is finished, the ISM can go into the the sleep state automatically. Therefore, when the terminal apparatus operate in a non-periodic-energy-saving mode, the base station does not need to consider when the ISM module wakes up and for how long the ISM module will stay awake. When auxiliary information is to be sent to the base station, it is possible to send only the operating time length of each operating to the base station as the auxiliary information. And the base station can assign a proper operating time length in time division multiplexing according to the information.

It is noted that, because the ISM module operates in an energy-saving mode and goes into operating state only after waking up, the operating time length of each operating of the ISM module in an energy-saving mode can be more precisely referred to as the operating time length after each waking up. The description of the various parameters included in the operating time length of each operating of the ISM module are similar to the above and are therefore omitted here.

It is noted that the terminal apparatus can select information related to operating time according to the operating mode of its ISM module and send it as the auxiliary information. However, when the ISM module is in a different operating mode, the type and specific meaning of the sent parameters may be different. In practical applications, a large number of terminal apparatus may be present and the operating modes of the ISM modules of the terminal apparatus may be different. Therefore, in order for the base station to distinguish the specific meanings of the parameters, in addition to the information related to the operating time length of the ISM module, the operating mode of the ISM module may also be sent to the base station as the auxiliary information. Therefore, the base station is made aware of whether the ISM module is in an energy-saving mode or a non-energy-saving mode, and exactly which energy-saving mode in the case of a energy-saving mode, so as to know the exact meanings of the received parameters.

As a matter of course, in practical applications, the ISM modules in respective terminal apparatus may operate at the same operating mode. In this case, the base station to which the LTE modules belong does not need to distinguish the operating modes of the ISM modules for different terminal apparatus. Hence, the base station to which the LTE modules belong may be notified of the operating mode of the ISM modes in the terminal apparatus in some other manner; then when the base station receives the auxiliary information, it is aware of the exact meanings of the received parameters.

As can be seen, information related to operating time of the ISM module can be sent to a base station to which the LTE module belongs as auxiliary information; the base station then can configure time division multiplexing configuration information according to the auxiliary information and return it to the terminal apparatus; the terminal apparatus can conduct time division multiplexing between the communication modules according to the time division multiplexing configuration information returned by the base station. In this manner, interference between communication modules in a terminal apparatus can be decreased effectively.

Specifically, when the ISM module operates in a non-energy-saving mode or a non-periodic-energy-saving mode, the information related to operating time may include the operating time length information of each operating of the ISM module. When the ISM module operates in a periodic-energy-saving mode, the information related to the operating time may include the sleep time information of the ISM module, including the waking moment of the ISM module and the waking period; or, in addition to the sleep time information, the information related to the operating time may also include the operating time length of each operating of the ISM module.

Figure 2:
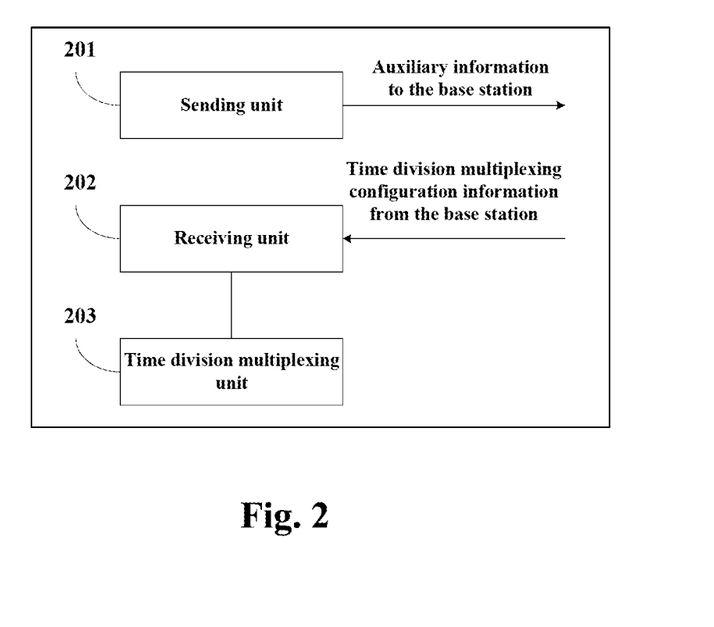
FIG. 2 is a schematic diagram illustrating a device provided by an embodiment of the present invention.

Corresponding to the method of decreasing interference between communication modules in a terminal apparatus, the embodiments of the present invention also provide a device of decreasing interference between communication modules in a terminal apparatus. Similarly, the communication modules include a communication system module in the terminal apparatus and a coexisting system module coexisting with the communication system module. As shown in FIG. 2, the device may include:

a sending unit 201, configured to send information related to operating time of the coexisting system module to a base station to which the communication system module belongs as auxiliary information;

a receiving unit 202, configured to receive time division multiplexing configuration information configured by the base station according to the auxiliary information; and a time division multiplexing unit 203, configured to conduct time division multiplexing between the communication modules according to the time division multiplexing configuration information.

When the coexisting system module operates in a non-energy-saving mode or a non-periodic-energy-saving mode, the information related to operating time of the coexisting system module sent by the sending unit 201 may include: operating time length information of each operating of the coexisting system module.

When the coexisting system module operates in a periodic-energy-saving mode, the information related to operating time of the coexisting system module sent by the sending unit 201 may include: sleep time information of the coexisting system module.

Specifically, the sleep time information of the coexisting system module may include: next waking moment and waking period.

As a matter of course, in order for the base station to learn the information related to the operating time of the ISM module, when the coexisting system module operates in a periodic-energy-saving mode, the information related to operating time of the coexisting system module sent by the sending unit 201 may include operating time length information of each operating of the coexisting system module, in addition to the sleep time information.

Specifically the operating time length information may include at least one of: minimum operating time length needed on condition that a preset spectral efficiency is ensured, average operating time length of an operating, minimum operating time length of an operating, and maximum operating time length of an operating.

Figure 3:
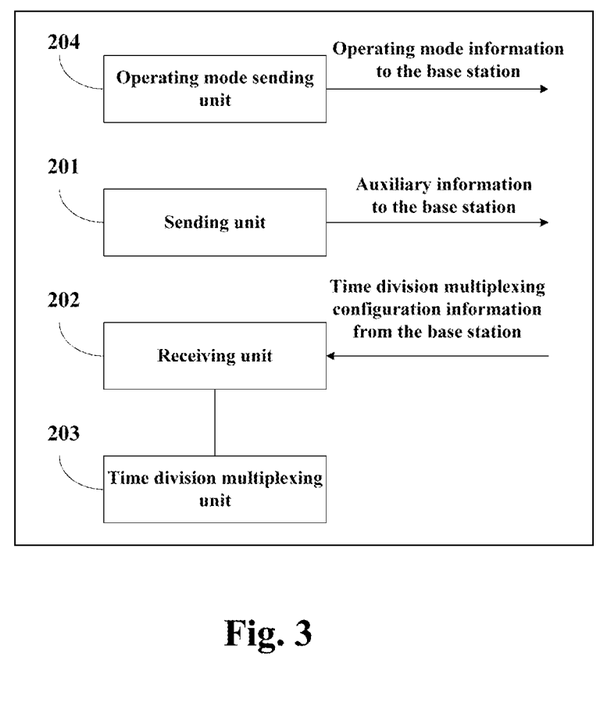
FIG. 3 is a schematic diagram illustrating a device provided by another embodiment of the present invention.

In order for the base station to learn the exact meanings of the parameters, as shown in FIG. 3, the device may further include:

an operating mode sending unit 204, configured to send operating mode information of the coexisting system module to the base station as auxiliary information.

The device according to the embodiments of the present invention and its components as shown in FIG. 2 and FIG. 3 can be configured to operate according to the flow corresponding to the method according to the embodiments of the present invention as shown in FIG. 1. Please refer to the corresponding descriptions above and details are omitted here.

By using the device according to the embodiments of the present invention, information related to operating time of the ISM module can be sent to a base station to which the LTE module belongs as auxiliary information; the base station then can configure time division multiplexing configuration information according to the auxiliary information and return it to the terminal apparatus; the terminal apparatus can conduct time division multiplexing between the communication modules according to the time division multiplexing configuration information returned by the base station. In this manner, interference between communication modules in a terminal apparatus can be decreased.

Corresponding to the device of decreasing interference between communication modules in a terminal apparatus, the embodiments of the present invention also provide a terminal apparatus, the terminal apparatus may include the device of decreasing interference between communication modules in a terminal apparatus according to the embodiments of the present invention, e.g., the device as shown in FIG. 2 or FIG. 3.

It is noted that detailed descriptions of embodiments of the device and the terminal apparatus above can be referred to the method embodiments and are therefore omitted here.

Furthermore, it should be noted that, the above series of processes and apparatus may also be implemented with software and/or firmware. In the case where they are implemented with software and/or firmware, a program constituting the software may be installed into a computer with dedicated hardware, for example, a general-purpose personal computer 400 as shown in FIG. 4 from a storage medium or a network, and the computer is capable of performing various functions when installed with various programs.

Figure 4:
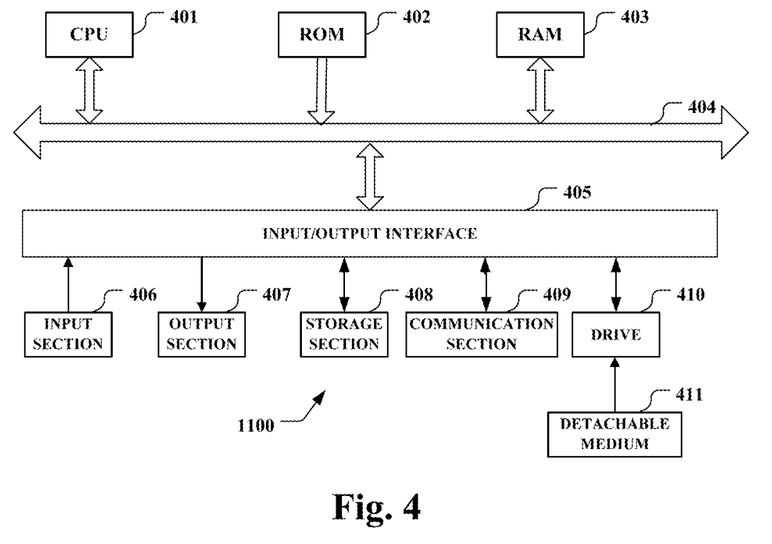
FIG. 4 is a block diagram illustrating an exemplary structure of a personal computer as the information processing device in an embodiment of the present invention.

In FIG. 4, a Central Processing Unit (CPU) 401 performs various processes based on a program stored in a Read Only Memory (ROM) 402 or a program loaded from a storage section 408 to a Random Access Memory (RAM) 403. In the RAM 403, data necessary when the CPU 601 performs the various processes or the like is also stored according to actual needs.

CPU 401, ROM 402, and RAM 403 are connected to one another via a bus 404. An input/output interface 405 is also connected to the bus 404.

To the input/output interface 405 are connected: an input section 406 including keyboard, mouse or the like; an output section 407 including a display such as Cathode Ray Tube (CRT), Liquid Crystal Display (LCD), and a loudspeaker or the like; the storage section 408 including a hard disk or the like; and a communication section 409 including a network interface card such as LAN card, modem or the like. The communication section 409 performs a communication process via the network such as the Internet.

A drive 410 is also connected to the input/output interface 405 if necessary. A removable medium 411, such as magnetic disk, optical disc, magneto-optical disk, semiconductor memory, is loaded on the drive 410 if necessary, so that a computer program read therefrom may be installed into the storage section 408 if necessary.

In the case where the above-described series of processes is implemented with software, the program that constitutes the software may be installed from a network such as the Internet or a storage medium such as the removable medium 411.

Those skilled in the art would appreciate that, the storage medium is not limited to the removable medium 411 having the program stored therein as illustrated in FIG. 4, which is delivered separately from the device for providing the program to the user. Examples of the removable medium 411 include a magnetic disk (including a floppy disk (registered trademark)), an optical disc (including Compact Disk-Read Only Memory (CD-ROM) and Digital Versatile Disk (DVD)), a magneto-optical disk (including Mini-Disk (MD) (registered trademark)), and semiconductor memory. Alternatively, the storage medium may be the ROM 402, the hard disk contained in the storage section 408 or the like, which has the program stores therein and is delivered to the user together with the device that contains them.

It should also be noted that, the steps in the above-described series of processes may, but not necessarily, be performed chronologically in the natural order of the description. Some steps may be performed in parallel or independently of one another.

The present invention and its advantages have been described in details. However, it should be understood that various modifications, alternatives, and combinations may be utilized without departing the spirit and scope of the present invention as defined by the appended claims hereto. Moreover, the terms "include", "comprise" and any other variants introduce a nonexclusive enumeration of features, so that the process, method, product or device that includes a series of elements not only includes the listed elements, but also includes those elements that are not explicitly listed and those inherent elements of the process, method, product or device. Without additional limitation, the wording "include an" element does not exclude the case where the process, method, product or device including the element includes other same elements.

What is claimed is:

1. A method of decreasing interference between communication modules in a terminal apparatus, the communication modules comprising a communication system module in the terminal apparatus and a coexisting system module coexisting with the communication system module, the method of decreasing interference between communication modules in a terminal apparatus comprising:
   determining, by the communication system module, an operating mode of the coexisting system module;
   when the coexisting system module operates in a non-energy-saving mode or a non-periodic-energy-saving mode, sending information related to operating time of the coexisting system module, including operating time length information of each operating of the coexisting system module, to a base station to which the communication system module belongs, and when the coexisting system module operates in a periodic-energy-saving mode, sending information related to operating time of the coexisting system module, including sleep time information of the coexisting system module, to a base station to which the communication system module belongs, as auxiliary information;
   configuring time division multiplexing configuration information by the base station according to the auxiliary information; and
   conducting time division multiplexing between the communication modules according to the time division multiplexing configuration information.

2. The method of decreasing interference between communication modules in a terminal apparatus according to claim 1, the operating time length information comprises at least one of: minimum operating time length needed on condition that a preset spectral efficiency is ensured, average operating time length of an operating, minimum operating time length of an operating, and maximum operating time length of an operating.

3. The method of decreasing interference between communication modules in a terminal apparatus according to claim 1, wherein the sleep time information of the coexisting system module comprises: waking moment and waking period of the coexisting system module.

4. The method of decreasing interference between communication modules in a terminal apparatus according to claim 1, wherein when the coexisting system module operates in a periodic-energy-saving mode, the information related to operating time of the coexisting system module further comprises: operating time length information of each operating of the coexisting system module.

5. The method of decreasing interference between communication modules in a terminal apparatus according to claim 4, the operating time length information comprises at least one of: minimum operating time length needed on condition that a preset spectral efficiency is ensured, average operating time length of an operating, minimum operating time length of an operating, and maximum operating time length of an operating.

6. The method of decreasing interference between communication modules in a terminal apparatus according to claim 1, further comprising: sending operating mode information of the coexisting system module to the base station as auxiliary information.

7. A device of decreasing interference between communication modules in a terminal apparatus, the communication modules comprising a communication system module in the terminal apparatus and a coexisting system module coexisting with the communication system module and the communication system module determining operating mode of the coexisting system module, the device of decreasing interference between communication modules in a terminal apparatus comprising:
   a sending unit, configured to, when the coexisting system module operates in a non-energy-saving mode or a non-periodic-energy-saving mode, send information related to operating time of the coexisting system module including operating time length information of each operating of the coexisting system module to a base station to which the communication system module belongs, and when the coexisting system module operates in a periodic-energy-saving mode, sending information related to operating time of the coexisting system module including sleep time information of the coexisting system module to a base station to which the communication system module belongs, as auxiliary information;

a receiving unit, configured to receive time division multiplexing configuration information configured by the base station according to the auxiliary information; and a time division multiplexing unit, configured to conduct time division multiplexing between the communication modules according to the time division multiplexing configuration information.

8. The device of decreasing interference between communication modules in a terminal apparatus according to claim 7, wherein the sleep time information of the coexisting system module comprises: next waking moment and waking period.

9. The device of decreasing interference between communication modules in a terminal apparatus according to claim 7, wherein when the coexisting system module operates in a periodic-energy-saving mode, the information related to operating time of the coexisting system module sent by the sending unit further comprises: operating time length information of each operating of the coexisting system module.

10. The device of decreasing interference between communication modules in a terminal apparatus according to claim 9, the operating time length information comprises at least one of: minimum operating time length needed on condition that a preset spectral efficiency is ensured, average operating time length of an operating, minimum operating time length of an operating, and maximum operating time length of an operating.

11. The device of decreasing interference between communication modules in a terminal apparatus according to claim 7, the operating time length information comprises at least one of: minimum operating time length needed on condition that a preset spectral efficiency is ensured, average operating time length of an operating, minimum operating time length of an operating, and maximum operating time length of an operating.

12. The device of decreasing interference between communication modules in a terminal apparatus according to claim 7, further comprising:

an operating mode sending unit, configured to send operating mode information of the coexisting system module to the base station as auxiliary information.

13. A terminal apparatus comprising the device of decreasing interference between communication modules in a terminal apparatus according to claim 7.

14. A non-transitory program product storing machine-readable instruction code, the instruction code performing a method of decreasing interference between communication modules in a terminal apparatus according to claim 1 when read and executed by a machine.

15. A non-transitory machine readable medium carrying machine-readable instruction code, the instruction code performing a method of decreasing interference between communication modules in a terminal apparatus according to claim 1 when read and executed by a machine.

* * * * *